United States Patent

[11] 3,612,629

| [72] | Inventors | Manfred Granzow<br>Meckenbeuren;<br>Roland Vath, Fischbach, both of Germany |
|---|---|---|
| [21] | Appl. No. | 800,801 |
| [22] | Filed | Jan. 27, 1969 |
| [45] | Patented | Oct. 12, 1971 |
| [73] | Assignee | Dornier System GmbH<br>Friedrichshafer, Germany |

[54] VACUUM-TIGHT MAINTENANCE-FREE BEARING
1 Claim, 4 Drawing Figs.

[52] U.S. Cl. .................................................. 308/132, 308/187
[51] Int. Cl. ...................................................... F16c 33/66
[50] Field of Search .......................................... 308/102, 125, 132, 187; 184/64, 102

[56] References Cited
UNITED STATES PATENTS

| 250,522 | 12/1881 | Godley | 308/125 |
|---|---|---|---|
| 451,007 | 4/1891 | Smith | 308/132 |
| 2,278,663 | 4/1942 | Loeffler et al. | 308/187 |
| 2,413,285 | 12/1946 | Bousky | 308/187 |
| 2,668,086 | 2/1954 | Marzolf | 308/132 |
| 2,850,336 | 9/1958 | Dochterman | 308/125 |
| 2,888,302 | 5/1959 | Cox et al. | 308/187 |
| 3,231,317 | 1/1966 | Dudar | 308/187 |
| 2,293,527 | 8/1942 | Atlee | 308/1 |
| 3,352,607 | 10/1967 | Boyd | 308/9 |

FOREIGN PATENTS

| 529,445 | 11/1940 | Great Britain | 184/102 |
|---|---|---|---|

Primary Examiner—Martin P. Schwadron
Assistant Examiner—Frank Susko
Attorney—James E. Bryan ABSTRACT: A support means has bearing means carried therein for movably supporting a movable member such as a shaft. Lubricating means is disposed within a recess in the support means in surrounding relationship to the movable member. This lubricating means defines a space therewithin having wick means and a lubricating substance disposed in such space. Outlet means is provided in the body means for dispensing the lubricating substance for lubricating the bearing means.

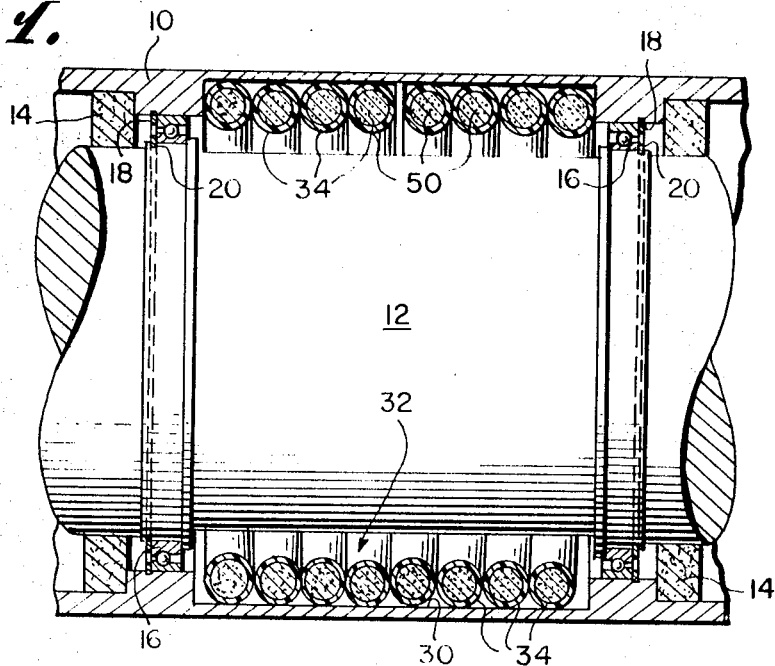
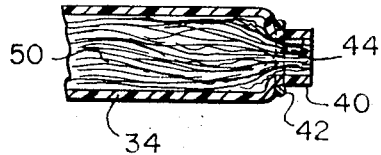
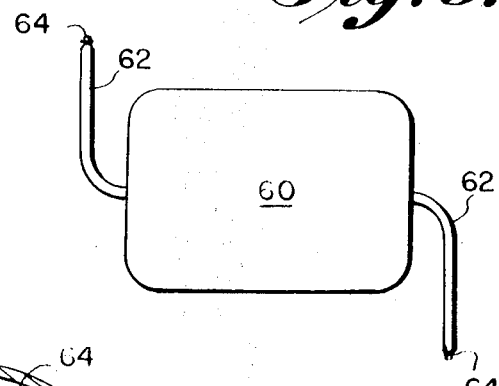
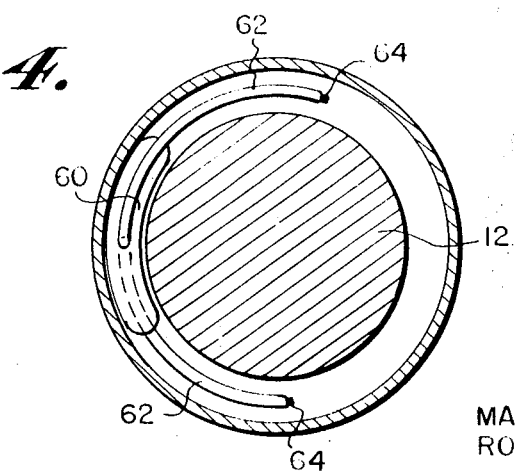
INVENTORS
MANFRED GRANZOW &
ROLAND VÄTH
BY Bryan and Butrum
ATTORNEYS 3,612,629

VACUUM-TIGHT MAINTENANCE-FREE BEARING

BACKGROUND OF THE INVENTION

The present invention relates to a bearing particularly suited for supporting movable elements of satellites and spacecraft.

In this type of application, the only suitable type of bearings are those which are substantially maintenance-free, or in other words, wherein the bearing is provided with oil or grease lubrication which is completely sealed and encased with respect to the surrounding structure. In this type of construction, a supply of lubricant is provided in the bearing which will enable proper operation over long periods of time.

In order to provide bearings with certain emergency running characteristics, bearing materials have been developed incorporating a porous surface. A suitable lubricant is stored in the pores of the material and is dispensed from such pores only when certain temperatures are reached in the bearing assembly due to friction. This type of arrangement is not always suitable under conditions existing in space, particularly since different temperature and pressure conditions prevail in such an environment.

Because of the problems encountered in space, steam pressure lubrication has been frequently employed in satellites and spacecraft. A certain quantity of lubricating substance is incorporated in a porous nylon body, and this lubricant can then be vaporized under vacuum conditions in the bearing. This type of a porous nylon body has the disadvantage that the lubricant carrying capacity per unit of weight is limited. Furthermore, the surface area from which the lubricant is vaporized cannot be varied, and accordingly the thickness of the oil film produced is difficult to determine and control. As a result, the useful life of the bearing is considerably limited.

SUMMARY OF THE INVENTION

The present invention incorporates an arrangement wherein the advantages of steam pressure lubrication are obtained without suffering the disadvantages of conventional constructions. The lubricating means of the present invention includes a body means defining a space within which is disposed a lubricating substance. The body means itself is impervious to this lubricating substance and has outlet means for dispensing the lubricating substance in the form of vapor.

The body means is mounted within a recess formed in a housing or support means which carries the bearing means for movably supporting a movable member. The lubricating means is mounted in the recess formed in the support means so as to be disposed in surrounding relationship to the movable member and adjacent to the bearing means which supports the movable member.

In order to ensure that the lubricant is effectively dispensed through the outlet means, a wick means is provided within the body means which causes the lubricant to flow by capillary action to the outlet means.

Means is also provided for controlling the size of the outlet means whereby the amount of lubricating substance dispensed from the lubricating means can be controlled, thereby enabling the thickness of the film or oil in the bearing to be accurately determined.

The arrangement of the present invention enables a substantially greater amount of lubricating substance to be carried per unit of weight as compared with prior art arrangements. The invention lubricating means may be manufactured in simpler and more economical manner than prior art constructions, and additionally, the lubricating means can be more readily mounted in the desired operative position.

BRIEF DESCRIPTION OF THE DRAWINGS

FIG. 1 is a longitudinal section of a bearing according to the present invention;

FIG. 2 is a section through one end of the lubricating means illustrated in FIG. 1;

FIG. 3 illustrates a modified form of the invention; and

FIG. 4 is a cross section of a bearing incorporating the construction shown in FIG. 3.

DESCRIPTION OF THE PREFERRED EMBODIMENTS

Referring now to the drawings wherein like reference characters designate corresponding parts throughout the several views, a first form of the invention is shown in FIGS. 1 and 2. A housing or support means 10 may be of generally tubular construction and a rotatable shaft 12 is journaled therewithin. Conventional gaskets 14 are disposed about the shaft, and a pair of spaced roller bearings 16 of usual construction serve to rotatably support movable member 12. The roller bearings are retained in operative position by conventional inner and outer snap rings 18 and 20.

A circumferentially extending recess 30 is formed in the inner surface of support means 10, and lubricating means indicated generally by reference numeral 32 is disposed within this recess. The lubricating mean comprises an elongated tubular member 34 of cylindrical cross-sectional configuration. This tubular member is impervious to the lubricating substance disposed therewithin as hereinafter described, and the tubular member may for example be formed of Teflon, a registered trademark for polytetrafluoroethylene. As seen in FIG. 1, the tubular member is disposed within the recess 32 in a generally helical arrangement. The number of turns of the tubular body means 34 depends upon the diameter of the body means as well as the axial length of recess 30 and the required quantity of lubricating substance.

As seen in FIG. 2, the body means 34 which may comprise a Teflon hose, is provided with a nozzlelike constriction 40 at the open end thereof, this nozzlelike constriction being surrounded by a relatively rigid ring 42. It is apparent that the size of this ring can be varied so as to vary the size of the outlet means 44 defined by the open end of the tubular body means. The opposite end of the tubular body means may be of a similar construction whereby lubricant is adapted to be dispensed from the outlet means defined by the opposite open ends of the tubular body means.

A wick means 50 is disposed within the tubular body means and may extend throughout the length thereof and adjacent the open ends of the body means. The remaining space defined within the body means may be substantially filled with a suitable lubricant substance such as oil or grease and the like.

The wick means is of such a construction as to cause the lubricant substance to move by capillary action to the outlet means of the body means. An ordinary cotton wick may be employed, for example. Additionally, a large number of thin small Teflon tubes can be inserted within the tubular body means, such small tubes also being capable of causing the lubricant substance to move to the outlet means by capillary action. The spaces formed within the body means 34 when a plurality of small tubes are inserted therewithin will also assist in supplying lubricant substance to the outlet means.

The arrangement ensures that the lubricant substance can be dispensed from the outlet means in equal quantities, and the lubricant substance will evaporate and be dispensed in vapor form for lubricating the adjacent bearing structure.

While the tubular body means 34 has been illustrated as being open only at the ends thereof, it is apparent that additional outlet means may be provided at one or more intermediate points thereof. Furthermore, the tubular body means may be of an endless construction or closed at the ends thereof with the outlet means formed at certain predetermined intermediate points thereof.

Referring now to FIGS. 3 and 4, a modified form of the invention is illustrated. As seen in these figures, the lubricating means is again mounted within a suitable recess formed in the surrounding support means or housing. The lubricating means in this embodiment includes an enlarged hollow contained portion 60 having a pair of elongated tubular portions 62 extending from opposite ends thereof and terminating in nozzlelike constrictions 64 similar to constriction 40 previously described.

It will be obvious to those skilled in the art that many modifications may be made within the scope of the present invention without departing from the spirit thereof, and the invention includes all such modifications.

We claim:

1. A shaft bearing assembly for use under vacuum conditions comprising a rotatable shaft, casing means surrounding said shaft and forming a cavity between said casing means and said shaft, bearing means between said shaft and said casing means, lubricant container means in said cavity having at least one tubular opening through which the lubricant can escape in the form of vapor in proximity to the bearing means, said tubular opening including a nozzlelike constriction, and annular means about said nozzlelike constriction for controlling the size thereof.